(12) United States Patent
Liu et al.

(10) Patent No.: US 10,989,637 B2
(45) Date of Patent: *Apr. 27, 2021

(54) BEARING SYSTEM FOR ROCK MECHANICS TEST UNDER HIGH TEMPERATURE AND HIGH PRESSURE MULTI-FIELD COUPLING IN DEEP EARTH

(71) Applicant: Sichuan University, Chengdu (CN)

(72) Inventors: Jianfeng Liu, Chengdu (CN); Heping Xie, Chengdu (CN); Jianliang Pei, Chengdu (CN); Lu Wang, Chengdu (CN); Wenxi Fu, Chengdu (CN); Xiaozhang Lei, Chengdu (CN); Dongjie Xue, Chengdu (CN); Yufeng Wei, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 3 days.

This patent is subject to a terminal disclaimer.

(21) Appl. No.: 16/396,689

(22) Filed: Apr. 28, 2019

(65) Prior Publication Data
US 2019/0331566 A1    Oct. 31, 2019

(30) Foreign Application Priority Data
Apr. 28, 2018 (CN) .......................... 201810401506.1

(51) Int. Cl.
*G01N 3/02* (2006.01)
*F16C 19/10* (2006.01)
(Continued)

(52) U.S. Cl.
CPC ............... *G01N 3/02* (2013.01); *F16C 19/10* (2013.01); *F16C 19/522* (2013.01);
(Continued)

(58) Field of Classification Search
CPC .... G01N 2203/0256; G01N 3/10; G01N 3/24; G01N 3/12; G01N 3/18; G01N 3/08; G01N 3/36; G01M 13/027
See application file for complete search history.

(56) References Cited

U.S. PATENT DOCUMENTS

| | | | | |
|---|---|---|---|---|
| 3,793,880 A | * | 2/1974 | Sugi .......................... | G01N 3/36 73/797 |
| 4,096,742 A | * | 6/1978 | Musolf .................... | G01N 3/10 73/813 |

(Continued)

*Primary Examiner* — Tran M. Tran
(74) *Attorney, Agent, or Firm* — Bayramoglu Law Offices LLC

(57) ABSTRACT

A bearing system for rock mechanics test under high temperature and high pressure multi-field coupling includes a force sensor lifting seat and a jack. The force sensor lifting seat includes a connecting disk connected with the jack, a support disk, and an operation channel. A groove dented downwards is arranged on the connecting disk, the support disk is disposed in the groove and freely propped upon the connecting disk; through holes of the connecting disk and the support disk form a control operation channel; and a limiting device is arranged for preventing an MTS triaxial force sensor from disengaging from the support disk. A bolt hole of the force sensor can be aligned with a mounting hole on a solid steel column by rotating the connecting disk for convenient and accurate bolting.

18 Claims, 2 Drawing Sheets

(51) Int. Cl.
  *F16C 19/52* (2006.01)
  *F16C 35/06* (2006.01)
  *G01N 3/12* (2006.01)
  *G01N 3/18* (2006.01)

(52) U.S. Cl.
  CPC ............ *F16C 19/525* (2013.01); *F16C 35/06* (2013.01); *G01N 3/12* (2013.01); *G01N 3/18* (2013.01); *F16C 2240/06* (2013.01); *F16C 2240/12* (2013.01); *F16C 2370/00* (2013.01)

(56) References Cited

U.S. PATENT DOCUMENTS

| | | | | |
|---|---|---|---|---|
| 4,579,003 A * | | 4/1986 | Riley | G01N 3/10 73/784 |
| 5,325,723 A * | | 7/1994 | Meadows | G01N 3/10 100/106 |
| 5,425,276 A * | | 6/1995 | Gram | G01N 3/32 73/781 |
| 6,058,784 A * | | 5/2000 | Carroll | G01N 3/20 73/856 |
| 6,286,629 B1 * | | 9/2001 | Saunders | B66B 9/0853 187/394 |
| 6,301,972 B1 * | | 10/2001 | Hall | G01N 3/04 73/857 |
| 6,581,437 B2 * | | 6/2003 | Chrystall | A43D 999/00 73/7 |
| 6,591,690 B1 * | | 7/2003 | Crockford | G01N 3/10 73/760 |
| 6,957,803 B2 * | | 10/2005 | Voegeli, Jr. | B66F 3/12 254/122 |
| 6,986,503 B2 * | | 1/2006 | Arzouman | B66F 1/08 254/2 B |
| 7,047,791 B2 * | | 5/2006 | Abe | F16F 9/3264 73/11.09 |
| 7,111,825 B2 * | | 9/2006 | Landsberger | B01L 9/00 254/122 |
| 7,204,160 B1 * | | 4/2007 | Sadegh | G01N 3/10 73/862.041 |
| 7,331,242 B2 * | | 2/2008 | Kim | G01N 3/60 73/766 |
| 7,513,168 B2 * | | 4/2009 | Alba | G01N 3/16 73/818 |
| 7,536,921 B1 * | | 5/2009 | Chu | G01N 3/10 73/760 |
| 7,624,647 B2 * | | 12/2009 | Liu | G01N 3/08 73/831 |
| 7,757,382 B2 * | | 7/2010 | Kang | F16C 35/06 29/724 |
| 8,052,121 B2 * | | 11/2011 | Christie | B66F 3/12 254/122 |
| 8,082,802 B1 * | | 12/2011 | Sadegh | G01N 3/08 73/856 |
| 8,191,862 B2 * | | 6/2012 | Arabian | B25B 27/304 254/10.5 |
| 8,291,772 B2 * | | 10/2012 | Lopez, III | G01N 3/24 73/845 |
| 8,375,802 B2 * | | 2/2013 | Khoury | G01N 33/24 73/784 |
| 8,448,921 B2 * | | 5/2013 | Hernandez | B66F 5/04 254/88 |
| 8,561,474 B2 * | | 10/2013 | Secq | G01N 3/10 73/825 |
| 8,646,345 B2 * | | 2/2014 | Israelachvili | G02B 21/26 73/864.91 |
| 8,656,788 B2 * | | 2/2014 | Jeong | G01N 3/24 73/815 |
| 8,707,804 B2 * | | 4/2014 | Rossi | G01M 13/025 73/862.321 |
| 8,740,191 B2 * | | 6/2014 | Litcher | B66F 3/22 254/122 |
| 8,869,619 B2 * | | 10/2014 | Liu | G01N 29/223 73/587 |
| 9,273,413 B2 * | | 3/2016 | Krishnan | C23C 16/4586 |
| 9,482,587 B2 * | | 11/2016 | Masuda | G01L 1/12 |
| 9,482,604 B2 * | | 11/2016 | Campbell | G01N 3/08 |
| 9,488,559 B2 * | | 11/2016 | Liu | G01N 3/08 |
| 9,488,560 B2 * | | 11/2016 | Liu | G01N 3/32 |
| 9,494,502 B2 * | | 11/2016 | Liu | G01N 3/04 |
| 9,500,574 B2 * | | 11/2016 | Liu | G01N 3/08 |
| 9,574,980 B2 * | | 2/2017 | Liu | G01N 3/08 |
| 9,696,218 B2 * | | 7/2017 | Lemmer | G01K 13/12 |
| 9,696,229 B2 * | | 7/2017 | Schulz | G01L 5/0028 |
| 9,714,891 B2 * | | 7/2017 | Liu | G01N 3/08 |
| 9,926,179 B2 * | | 3/2018 | Arzouman | B66F 5/04 |
| 10,006,887 B2 * | | 6/2018 | Liu | G01N 29/14 |
| 10,012,577 B2 * | | 7/2018 | Zhou | G01N 3/22 |
| 10,018,594 B2 * | | 7/2018 | Liu | G01N 29/223 |
| 10,018,595 B2 * | | 7/2018 | Liu | G01N 29/14 |
| 10,067,077 B2 * | | 9/2018 | Blank | G01N 23/046 |
| 10,292,885 B2 * | | 5/2019 | Tong | A61G 7/0005 |
| 10,684,203 B2 * | | 6/2020 | Zhou | G01N 3/24 |
| 2003/0048969 A1 * | | 3/2003 | Hunter | G01B 5/012 384/610 |
| 2010/0089124 A1 * | | 4/2010 | Katti | G01N 3/12 73/38 |
| 2017/0003263 A1 * | | 1/2017 | Huang | G01L 15/00 |
| 2018/0340874 A1 * | | 11/2018 | Liu | G01N 33/24 |
| 2019/0331568 A1 * | | 10/2019 | Liu | G01N 33/24 |
| 2019/0331569 A1 * | | 10/2019 | Liu | G01N 33/24 |
| 2019/0331570 A1 * | | 10/2019 | Liu | G01N 3/12 |
| 2020/0003607 A1 * | | 1/2020 | Bafile | B66C 23/90 |

\* cited by examiner

US 10,989,637 B2

BEARING SYSTEM FOR ROCK MECHANICS TEST UNDER HIGH TEMPERATURE AND HIGH PRESSURE MULTI-FIELD COUPLING IN DEEP EARTH

CROSS REFERENCE TO RELATED APPLICATIONS

This application is based upon and claims priority to Chinese Patent Application No. 201810401506.1, filed on Apr. 28, 2018 the entire contents of which are incorporated herein by reference.

TECHNICAL FIELD

The invention belongs to the field of rock mechanics test of engineering rock masses, in particular to a bearing system for dismounting and mounting an MTS high temperature and high pressure triaxial force sensor.

BACKGROUND

Rock mechanics triaxial tests at high temperature and high pressure are necessary basic tests for all kinds of rock engineering in deep earth. Therefore, reliable tests are of great significance for rock engineering construction. In practical tests, accuracy and reliability of test results are compromised by inevitable damages to force sensors working as core member in laboratory high temperature and high pressure triaxial tests. Therefore, the force sensors are required be checked, maintained and replaced at a regular interval. The MTS rock mechanics test system is one of the world's most advanced rock mechanics equipment. The high temperature and high pressure force sensor, its core structure, relates to high-precision technology, high price and heavy mass, while the high temperature and high pressure triaxial chamber where the sensor is arranged is special in structure and narrow in space. With the possible unstable suction force between the high temperature and high pressure sensor and the upper connector, and precise row lines (e.g. load, deformation, seepage and temperature) densely arranged on the base of the high temperature and high pressure triaxial chamber there below, it is difficult to dismount and mount the high temperature and high pressure sensor. Improper dismounting and mounting are likely to lead to damages to the sensor and the row lines on the triaxial chamber base, injuries and other major property losses and personal injuries. To address the problem, the conventional method is to manually lift the triaxial force sensor and dismount/mount the sensor with the cooperation of multiple people. The method allows a short time for lifting with lots of labor and the sensor is possibly shaking during the process. Therefore, the method is low in accuracy and slow in the process of dismounting and mounting, and dismounting and mounting risks still exist. Currently, there is no special equipment effectively solving the problem of dismounting and mounting the high temperature and high pressure sensor.

SUMMARY

The technical problem to be solved by the invention is to provide a bearing system for rock mechanics test under high temperature and high pressure multi-field coupling in deep earth, in order to improve mounting and dismounting efficiency, safety and stability of an MTS high temperature and high pressure triaxial force sensor.

The technical solution of the invention is a bearing system for rock mechanics test under high temperature and high pressure multi-field coupling in deep earth, comprising a high temperature and high pressure force sensor lifting seat and a jack propped upon an MTS hydraulic servo table and configured to lift the force sensor lifting seat:

The force sensor lifting seat comprises a connecting disk connected with the jack, a support disk configured to support an MTS triaxial force sensor and an operation channel for dismounting and mounting the MTS triaxial force sensor; a groove dented downwards is arranged above the connecting disk, the support disk is disposed in the groove and freely propped upon the connecting disk, and the support disk is radially limited by side walls of the groove; both the connecting disk and the support disk are in an annular shape with a through hole arranged at the middle, and the through holes of the connecting disk and the support disk form a control operation channel; and a limiting device is arranged to prevent the MTS triaxial force sensor from disengaging from the support disk.

Furthermore, a flange protruding upward is arranged at the middle of the groove in an axial direction thereof, and the flange, an inner wall of the groove and a bottom of the groove are enclosed to form an circular slideway; the flange is peripherally sleeved with a round rod slidable in the slideway (113); and the support disk is freely propped upon the round rod.

Further, the limiting device is a stop collar, and the stop collar is arranged above the connecting disk and detachably connected with the connecting disk; an inner wall of the stop collar and an upper surface of the support disk are enclosed to form an accommodating cavity fitting with the MTS triaxial force sensor; and a locking member is arranged on the stop collar to lock a relative position of the force sensor.

Further, the inner wall of the stop collar extends inwards in the radial direction thereof and protrudes into the groove of the connecting disk; and the support disk is vertically limited by a bottom surface of the protrusion of the stop collar extending inwards.

Further, the locking member is a stop screw radially arranged along the stop collar and running through the stop collar, and the stop screw and the stop collar are in threaded connection.

Further, the jack comprises a bottom pedestal, a top support table and a jacking mechanism arranged therebetween and driving the support table to move up and down; the jacking mechanism comprises four transmission rods, and every two of the four transmission rods form an elbowed transmission member, each of the elbowed transmission members is provided with a connecting lug; two transmission rods of each of the elbowed transmission members are hinged with the connecting lug; the two elbowed transmission members are oppositely arranged to form a parallelogram structure with equal side length, one end of the parallelogram structure is hinged with a bottom lug arranged on the pedestal, and the other end thereof is hinged with a top lug arranged on the support table; a connecting lug is provided for every two of the transmission rods; and a threaded rod is arranged diagonally to the parallelogram structure, and the threaded rod and the connecting lug are in threaded connection to drive the elbowed transmission members to stretch and draw back.

Further, the connecting lug is a grooved member with a groove structure for accommodating the corresponding transmission rod; the bottom lug is a grooved member with a groove structure for accommodating the corresponding transmission rod; and the top lug is also a grooved member with a groove structure for accommodating the corresponding transmission rod.

Further, the support table is connected with the connecting disk by means of a group of support rods; these support rods are threaded, nuts fitting with the threads are fixedly attached to an upper surface and a lower surface of the support table, and the support rods run through the support table and are in threaded connection with the nuts on the upper and lower surfaces of the support table.

Further, a plane mirror is arranged on the upper surface of the support table, and the operation channel and an orthographic projection of the plane mirror on the upper surface of the support table are matched; and the plane mirror is hinged to the support table by means of a spherical hinge.

Further, a locating hole fitting with a central alignment pin of the MTS hydraulic servo table is arranged on the pedestal.

The beneficial effects of the invention are as follows: The invention replaces the conventional dismounting and mounting method for force sensors involving the cooperation of multiple people and manual lifting, improves mechanization degree of the dismounting and mounting, provides stable and powerful support for the force sensor, effectively economizes on manpower and reduces risks of dropping the sensor and secondary damages to the sensor that may occur during manual operation; with the fixing effect generated by the stop collar and the stop screw on the connecting disk, a certain pulling force can be applied to the high temperature and high pressure force sensor through the transmission rods or a built-in loading system of the MTS, so as to effectively solve the problem that the force sensor is difficult to be disengaged from the upper connector when a suction force exists therebetween, and make the dismounting of the force sensor safer; the groove dented downwards is arranged on the connecting disk, the support disk is arranged in the groove and freely propped upon the connecting disk, and the support disk is radially limited by the side walls of the groove, so the support disk can only rotate around the axis thereof; as a result, a bolt hole of the force sensor can be aligned with a mounting hole on a solid steel column by rotating the support disk for convenient and accurate bolting, shortened alignment process and improved mounting efficiency.

Figure 1:
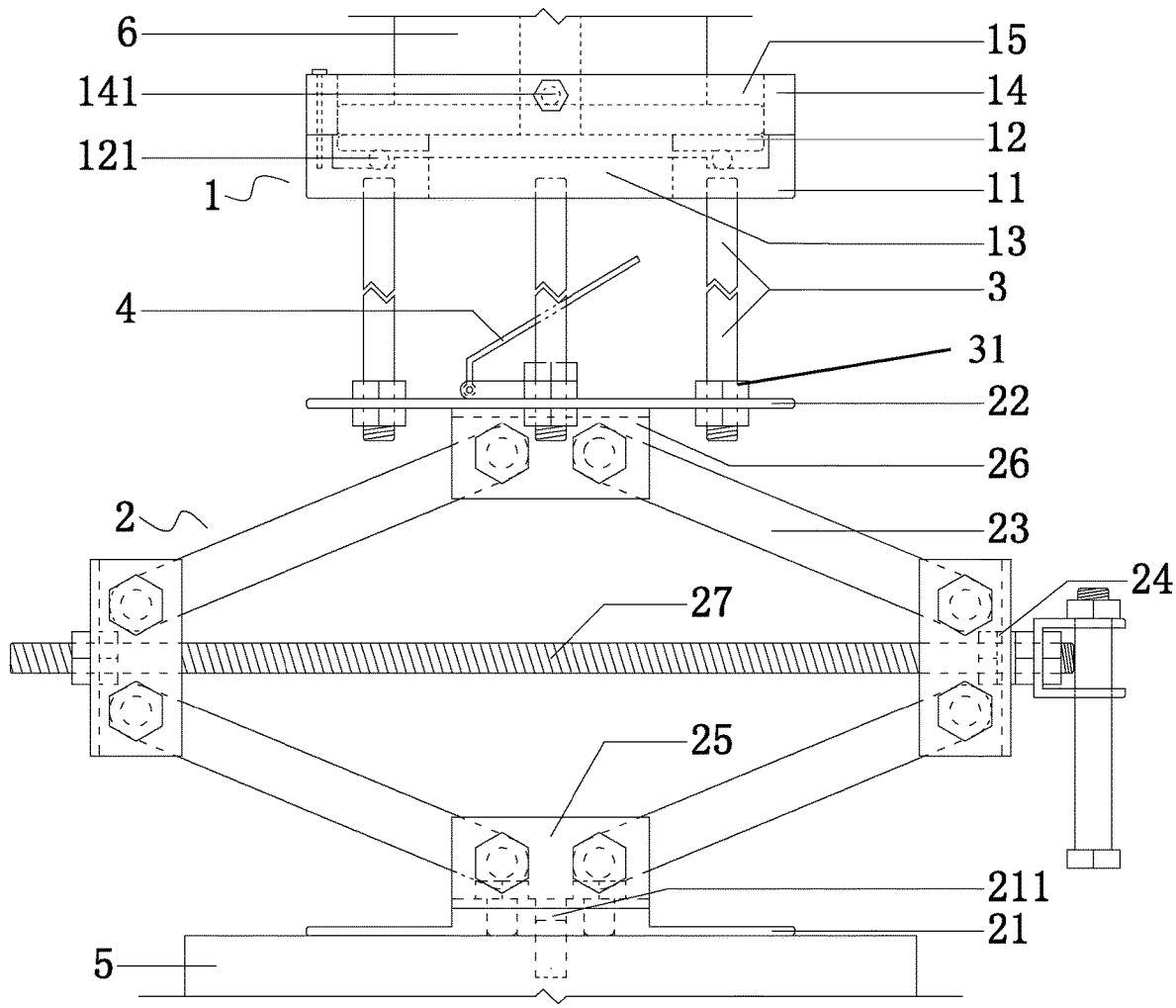
FIG. 1 is a structural diagram of the invention.

Marks in the figures: force sensor lifting seat 1, jack 2, connecting disk 11, MTS triaxial force sensor 6, groove 111, flange 112, slideway 113, support disk 12, round rod 121, operation channel 13, stop collar 14, accommodating cavity 15, stop screw 141, pedestal 21, locating hole 211, support table 22, transmission rod 23, connecting lug 24, bottom lug 25, top lug 26, threaded rod 27, support rod 3, nut 31, plane mirror 4 and MTS hydraulic servo table 5.

DETAILED DESCRIPTION OF THE EMBODIMENTS

Figure 2:
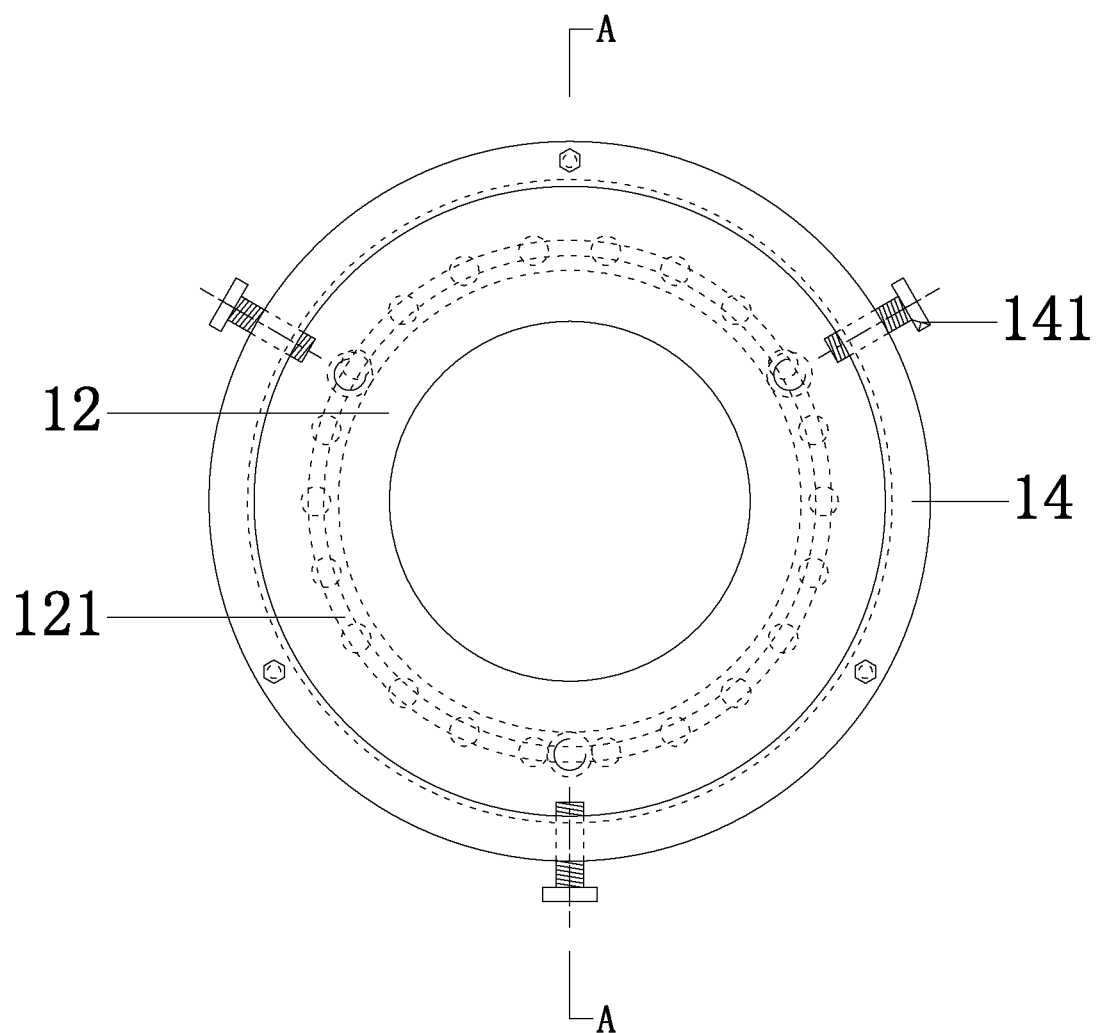
FIG. 2 is a structural diagram of a force sensor lifting seat.
Figure 3:
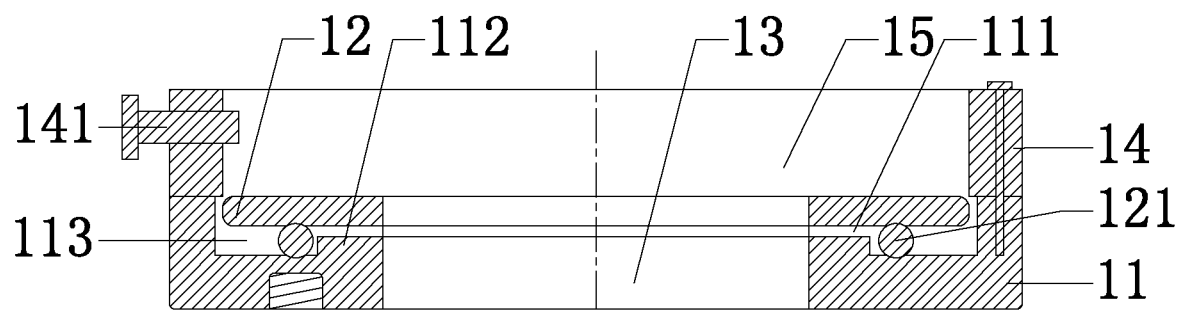
FIG. 3 is an A-A sectional view of FIG. 2.

The invention will be further described in combination with drawings and embodiments:

As shown in FIGS. 1 to 3, a bearing system for rock mechanics test under high temperature and high pressure multi-field coupling in deep earth, comprises a force sensor lifting seat 1 and a jack 2 propped upon an MTS hydraulic servo table 5 and configured to lift the force sensor lifting seat 1;

The force sensor lifting seat 1 comprises a connecting disk 11 connected with the jack 2, a support disk 12 configured to support an MTS triaxial force sensor 6 and an operation channel 13 for dismounting and mounting the MTS triaxial force sensor 6; a groove 111 dented downwards is arranged above the connecting disk 11, the support disk 12 is disposed in the groove 111 and freely propped upon the connecting disk 11, and the support disk 12 is radially limited by side walls of the groove 111; both the connecting disk 11 and the support disk 12 are in an annular shape with a through hole arranged at the middle, and the through holes of the connecting disk 11 and the support disk 12 form a control operation channel 13; and a limiting device is arranged to prevent the MTS triaxial force sensor 6 from disengaging from the support disk 12.

According to the invention, the force sensor lifting seat 1 is configured to lift the force sensor and propped upon the jack 2, and the force sensor is lifted to the mounting position by jacking up the force sensor lifting seat 1 by means of the jack 2, or withdrawn from a rigid column of a triaxial chamber by jacking down the force sensor lifting seat 1 by means of the jack 2.

The connecting disk 11 of the lifting seat 1 is connected with the jack 2, and the support disk 12 is configured to support the MTS triaxial force sensor 6. The support disk 12 is freely propped upon the connecting disk 11, that is, the support disk 12 is limited by the underneath connecting disk 11 to prevent the support disk 12 from falling vertically. However, there is no connector or the like arranged between the support disk 12 and the connecting disk 11, so they can move relatively in the radial direction or rotate in the axial direction. As the support disk 12 and the connecting disk 11 can move relatively, the support disk 12 arranged in a groove 111 of the connecting disk 11 can be radially limited by side walls of the groove 111, so as to prevent the support disk 12 from disengaging from the connecting disk 11 when the support disk 12 moves in relative to the connecting disk 11 in the radial direction, thus the radial movement of the support disk 12 and the connecting disk 11 is limited, and the support disk 12 can only rotate around the axis thereof. As a result, a bolt hole of the force sensor can be aligned with a mounting hole on a solid steel column by rotating the support disk 12 for convenient and accurate bolting. The control operation channel 13 is formed by through holes of the connecting disk 11 and the support disk 12. An operator can mount and remove screws through the operation channel 13 to expand operation space for mounting and dismounting, and avoid interference of related members in the force sensor lifting seat 1 that exists in the perpendicular mounting process, and eliminate deviations from the mounting position due to contact with the force sensor lifting seat 1 by the operator. Furthermore, the dismounting and mounting of the force sensor with supporting device rather than manual support save both time and labor; the force sensor is supported in a more stable and powerful manner, a certain pulling force can be applied to the force sensor after the force sensor and the support disk 12 are limited to effectively solve the problem that the force sensor is difficult to be dismounted in the presence of oil suction force, and to prevent the force sensor from accidental drop or damage.

As shown in FIGS. 1 to 3, to reduce frictional resistance between the connecting disk 11 and the support disk 12, a flange 112 protruding upward is preferably arranged at the middle of the groove 111 in the axial direction, and the flange 112, an inner wall of the groove 111 and a bottom of the groove 111 are enclosed to form an circular slideway 113; the flange 112 is peripherally sleeved with a round rod 121 slidable in the slideway 113; and the support disk 12 is freely propped upon the round rod 121.

The round rod 121 is arranged between the connecting disk 11 and the support disk 12 to reduce friction surface and decrease the friction resistance. The round rod 121 is radially limited by the flange 112, so that the round rod 121 can rotate in the axial direction around the flange 112, and the support disk 12 is freely propped upon the round rod 121 to facilitate rotation movement of the support disk 12.

The limiting device for preventing the MTS triaxial force sensor 6 from disengaging from the support disk 12 can be a hoop encircling the force sensor and connected with the connecting disk 11. However, the hoop encircling the force sensor can be mounted on or dismounted from the force sensor in the same procedure. As the hoop and the force sensor have large contact area, the probability of damaging the force sensor rises with the increased collision probability when they are mounted and dismounted.

As a preferred embodiment, as shown in FIGS. 1 and 3, the limiting device is a stop collar 14, and the stop collar 14 is arranged above the connecting disk 11 and detachably connected with the connecting disk 11; an inner wall of the stop collar 14 and an upper surface of the support disk 12 are enclosed to form an accommodating cavity 15 fitting with the MTS triaxial force sensor 6; and a locking member is arranged on the stop collar 14 to lock a relative position of the sensor.

To avoid uneven pressure on the support disk 12 by the force sensor, which leads to an upturned end of the support disk 12 and deviation of the force sensor axis from the mounting position, the inner wall of the stop collar 14 preferably extends inwards in the radial direction and protrudes into the groove 111 of the connecting disk 11; and the support disk 12 is vertically limited by the bottom surface of the protrusion extending inwards of the stop collar 14.

The locking member can be a sucker or the like, but sucking stability of the sucker depends on flatness of the force sensor surface and other factors. Preferably, the locking member is a stop screw 141 radially arranged along the stop collar 14 and running through the stop collar 14, and the stop screw 141 and the stop collar 14 are in threaded connection. The stop screw 141 has characteristics of low cost, easy operation and strong adaptability.

As shown in FIG. 1, the jack 2 preferably comprises a bottom pedestal 21, a top support table 22 and a jacking mechanism arranged therebetween and driving the support table 22 to move up and down; the jacking mechanism comprises four transmission rods 23, and every two of the four transmission rods 23 form an elbowed transmission member; each of the elbowed transmission members is provided with a connecting lug 24; two transmission rods 23 of each of the elbowed transmission members are hinged with the connecting lug 24; the two elbowed transmission members are oppositely arranged to form a parallelogram structure with equal side length, one end of the parallelogram structure is hinged with a bottom lug 25 arranged on the pedestal 21, and the other end thereof is hinged with a top lug 26 arranged on the support table 22; a connecting lug 24 is provided for every two of the transmission rods 23; and a threaded rod 27 is arranged diagonally for the parallelogram structure, and the threaded rod 27 and the connecting lug 24 are in threaded connection to drive the elbowed transmission members to stretch and draw back.

The force sensor lifting seat 1 is lifted up and down by rotating the threaded rod 27. The operation is simple and easy to be controlled, so the force sensor rises and falls conveniently and efficiently. The threaded rod 27 can be manually driven or electrically driven.

Preferably, the connecting lug 24 is a grooved member with a groove structure for accommodating the corresponding transmission rod 23; the bottom lug 25 is a grooved member with a groove structure for accommodating the corresponding transmission rod 23; and the top lug 26 is also a grooved member with a groove structure for accommodating the corresponding transmission rod 23. The connecting lug 24, the bottom lug 25 and the top lug 26 can be members in various shapes, but grooved member provides greater strength.

The support table 22 is able to be directly connected with the connecting disk 11, providing that a specified lifting range is achieved and the specification of the jack meets requirements. Preferably, the support table 22 is connected with the connecting disk 11 by means of a group of support rods 3; the support rods 3 are threaded, nuts 31 fitting with the threads are fixedly attached to an upper surface and a lower surface of the support table 22, and the support rods 3 run through the support table 22 and are in threaded connection with the nuts 31.

The support table 22 and the connecting disk 11 are connected by means of the support rod 3 and the nuts 31, so that another lifting structure is formed between the support table 22 and the connecting disk 11. Therefore, the requirements for specification of the jack 2 can be lowered. Once the support disk 12 deviates from the horizontal position, it can be centered by slightly adjusting the support rod 3 and the nuts 31.

To conveniently observe positions of a limiting hole and a center hole on the bottom of the force sensor in the triaxial chamber, centering adjustment is directed to simplify the dismounting and mounting of the force sensor. As shown in FIG. 1, a plane mirror 4 is preferably arranged on the upper surface of the support table 22, and the operation channel 13 and an orthographic projection of the plane mirror 4 on the upper surface of the support table 22 are matched; and the plane mirror 4 is hinged to the support table 22 by means of a spherical hinge.

The plane mirror 4 is hinged to the support table 22 by means of the spherical hinge, so that the plane mirror 4 can pitch and rotate as required.

To mount the device by using the structure of the MTS test system, as shown in FIG. 1, a locating hole 211 fitting with a central alignment pin of an MTS hydraulic servo table 5 is preferably arranged on the pedestal 21. When the device aligns with the MTS hydraulic servo table 5 and is fixed by bolts, on the one hand, the force sensor can be lifted up and down by lifting the device up and down, and on the other hand, the device and the force sensor can be lifted up and down together by a built-in loading system of the MTS if lifting motion of the device is limited.

What is claimed is:

1. A bearing system for a rock mechanics test under a high temperature and a high pressure multi-field comprising:
    a sensor lifting seat;
    a jack propped upon a mechanics test system hydraulic servo table, wherein the jack is configured to lift the sensor lifting seat;
    wherein the sensor lifting seat comprises:
        a connecting disk;
        a support disk;
        an operation channel;

wherein the connecting disk connects with the jack, the support disk is configured to support a mechanics test system triaxial force sensor, and the operation channel is configured to dismount and mount the mechanics test system triaxial force sensor;
a flange provided on the connecting disk;
a round rod on the connecting disk
a groove formed by a space between the support disk and the flange, wherein the support disk is disposed on the round rod and freely propped upon the round rod, and the support disk is radially limited by a stop collar;
wherein both the connecting disk and the support disk are in a form of circular shape with a through hole, wherein the operation channel is formed by aligning the through holes of the connecting disk and the support disk; and
a limiting device is arranged to prevent the mechanics test system triaxial force sensor from disengaging from the support disk.

2. The bearing system of claim 1,
wherein
the flange is peripherally sleeved with the round rod slidable in a slideway; and
the support disk is freely propped upon the round rod.

3. The bearing system of claim 1,
wherein the limiting device is the stop collar, and the stop collar is arranged above the connecting disk and detachably connected with the connecting disk;
an inner wall of the stop collar and an upper surface of the support disk are enclosed to form an accommodating cavity fitting with the mechanics test system triaxial force sensor; and
a locking member is arranged on the stop collar to lock a relative position of the mechanics test system triaxial force sensor.

4. The bearing system of claim 3,
wherein
the support disk is vertically limited by a bottom surface of the stop collar.

5. The bearing system of claim 3,
wherein the locking member is a stop screw radially arranged along the stop collar and running through the stop collar; and
the stop screw and the stop collar are in a threaded connection.

6. The bearing system of claim 1,
wherein the jack comprises a bottom pedestal, a top support table and a jacking mechanism arranged between the bottom pedestal and the top support table;
the jacking mechanism is configured to drive the top support table to move up and down, the jacking mechanism comprises four transmission rods, and every two of the four transmission rods form an elbowed transmission member;
a first connecting lug is provided to each of the elbowed transmission members; wherein the two transmission rods of each of the elbowed transmission members are hinged with the first connecting lug;
the elbowed transmission members are oppositely arranged to form a parallelogram structure with an equal side length, a first end of the parallelogram structure is hinged with a bottom lug arranged on the bottom pedestal, and a second end of the parallelogram structure is hinged with a top lug arranged on the top support table;
a second connecting lug is provided for every two of the transmission rods; wherein a threaded rod is arranged diagonally for the parallelogram structure, and the threaded rod and the second connecting lug are in a threaded connection to drive the elbowed transmission members to stretch and draw back.

7. The bearing system claim 6,
wherein the connecting lug is a grooved member with a first groove structure for accommodating a first transmission rod;
the bottom lug is a grooved member with a second groove structure for accommodating a second transmission rod; and
the top lug is also a grooved member with a third groove structure for accommodating a third transmission rod.

8. The bearing system of claim 6,
wherein the top support table is connected with the connecting disk by means of a group of support rods; and
the group of support rods are threaded, nuts fitting with threads of the group of support rods are fixedly attached to an upper surface and a lower surface of the top support table, and the group of support rods run through the top support table and are in a threaded connection with the nuts on the upper and lower surfaces of the top support table.

9. The bearing system of claim 8,
wherein a plane mirror is arranged on the upper surface of the top support table, and the operation channel and an orthographic projection of the plane mirror on the upper surface of the top support table are matched; and
the plane mirror is hinged to the top support table by means of a spherical hinge.

10. The bearing system of claim 6,
wherein a locating hole fitting with a central alignment pin of the mechanics test system hydraulic servo table is arranged on the bottom pedestal.

11. The bearing system of claim 2,
wherein the limiting device is the stop collar, and the stop collar is arranged above the connecting disk and detachably connected with the connecting disk;
an inner wall of the stop collar and an upper surface of the support disk are enclosed to form an accommodating cavity fitting with the mechanics test system triaxial force sensor; and
a locking member is arranged on the stop collar to lock a relative position of the mechanics test system triaxial force sensor.

12. The bearing system of claim 11,
wherein
the support disk is vertically limited by a bottom surface of the stop collar.

13. The bearing system of claim 11,
wherein the locking member is a stop screw radially arranged along the stop collar and running through the stop collar; and
the stop screw and the stop collar are in a threaded connection.

14. The bearing system of claim 2,
wherein the jack comprises a bottom pedestal, a top support table and a jacking mechanism arranged between the bottom pedestal and the top support table;
the jacking mechanism is configured to drive the top support table to move up and down, the jacking mechanism comprises four transmission rods, and every two of the four transmission rods form an elbowed transmission member;
each of the elbowed transmission members is provided with a first connecting lug;

the two transmission rods of each of the elbowed transmission members are hinged with the first connecting lug;

the elbowed transmission members are oppositely arranged to form a parallelogram structure with an equal side length, a first end of the parallelogram structure is hinged with a bottom lug arranged on the bottom pedestal, and a second end of the parallelogram structure is hinged with a top lug arranged on the top support table;

a second connecting lug is provided for every two of the transmission rods; and a threaded rod is arranged diagonally for the parallelogram structure, and the threaded rod and the second connecting lug are in a threaded connection to drive the elbowed transmission members to stretch and draw back.

15. The bearing system of claim 14, wherein the connecting lug is a grooved member with a first groove structure for accommodating a first transmission rod;

the bottom lug is a grooved member with a second groove structure for accommodating a second transmission rod; and the top lug is also a grooved member with a third groove structure for accommodating a third transmission rod.

16. The bearing system of claim 14, wherein the top support table is connected with the connecting disk by means of a group of support rods; and the group of support rods are threaded, nuts fitting with threads of the group of support rods are fixedly attached to an upper surface and a lower surface of the top support table, and the group of support rods run through the top support table and are in a threaded connection with the nuts on the upper and lower surfaces of the top support table.

17. The bearing system of claim 16, wherein a plane mirror is arranged on the upper surface of the top support table, and the operation channel and an orthographic projection of the plane mirror on the upper surface of the top support table are matched; and the plane mirror is hinged to the top support table by means of a spherical hinge.

18. The bearing system of claim 14, wherein a locating hole fitting with a central alignment pin of the mechanics test system hydraulic servo table is arranged on the bottom pedestal.

* * * * *